United States Patent [19]

Markakis

[11] 3,756,365

[45] Sept. 4, 1973

[54] MAGNETIC RECORDING AND EDITING TYPEWRITER

[75] Inventor: Michael J. Markakis, Palo Alto, Calif.

[73] Assignee: SCM Corporation, New York, N.Y.

[22] Filed: Oct. 8, 1971

[21] Appl. No.: 187,669

[52] U.S. Cl. ............ 197/1 R, 197/19, 340/174.1 F, 346/74 MP

[51] Int. Cl. ............ B41j 5/40

[58] Field of Search ............ 197/1 R, 19, 20; 340/174.1 F; 346/74 MP

[56] References Cited

UNITED STATES PATENTS

| | | | |
|---|---|---|---|
| 2,258,106 | 10/1941 | Bryce | 197/1 R X |
| 3,060,272 | 10/1962 | Bacon et al. | 197/19 |
| 3,072,238 | 1/1963 | Chan | 197/1 R |
| 3,171,107 | 2/1965 | Rogers | 340/174.1 F |
| 3,283,871 | 11/1966 | Becking et al. | 197/20 |
| 3,308,449 | 3/1967 | Vemura | 340/174.1 F |
| 3,358,804 | 12/1967 | Feldman | 197/20 |
| 3,413,624 | 11/1968 | Murdoch et al. | 197/19 X |
| 3,427,409 | 2/1969 | Atsumi | 340/174.1 F |
| 3,526,725 | 9/1970 | Camras | 340/174.1 F |
| 3,614,394 | 10/1971 | Bindshedler | 197/1 R |

*Primary Examiner*—Edgar S. Burr
*Attorney*—Milton M. Wolson

[57] ABSTRACT

A machine is disclosed for simultaneously making typewritten and magnetic records, for editing magnetic records, and for automatically making typewritten record copies of edited or unedited magnetic records.

The editing typewriter comprises typewriter elements consisting of a platen and printing type spaced from the platen. Means are provided for stepping one of the typewriter elements with respect to the other to effect character spacing within a line of type. The editing typewriter also includes magnetic recorder support elements consisting of a magnetic record support and a magnetic head support mounted adjacent the magnetic record support for relative movement in a predetermined direction with respect to the magnetic record support. A magnetic recording head is mounted to the magnetic head support. A magnetic reproducing head is also mounted to the magnetic head support spaced from the magnetic recording head in the aforementioned predetermined direction. Structural means "pantographically" link one of the typewriter elements with one of the magnetic recorder support elements whereby the magnetic recording head and the magnetic reproducing head may be stepped in the predetermined direction with respect to the magnetic record support for magnetically recording and reproducing a line of magnetically encoded information on a magnetic record supported on the magnetic record support when one of the typewriter elements is stepped with respect to the other.

7 Claims, 8 Drawing Figures

INVENTOR
MICHAEL J. MARKAKIS
BY Milton Wolson

INVENTOR
MICHAEL J. MARKAKIS
BY Milton Wolson

INVENTOR.
MICHAEL J. MARKAKIS
BY Milton Wolson

INVENTOR.
MICHAEL J. MARKAKIS

BY [signature]

INVENTOR.
MICHAEL J. MARKAKIS
BY Milton Wolson

MAGNETIC RECORDING AND EDITING TYPEWRITER

BACKGROUND OF THE INVENTION

This invention relates to editing typewriters which is to say machines capable of simultaneously making printed and magnetic records, and which ordinarily have the additional capability of editing magnetic records and of automatically making typewritten record copies of magnetic records in either their edited or unedited form.

Typewriters generally must have means for either laterally stepping a printable record past a typewriter printing station or of laterally stepping the printing station itself over a printable record in order to provide means for printing a succession of characters in forming horizontal lines of print. In addition, means ordinarily must also be provided for stepping the printable record vertically to provide means for printing a succession of such lines thereon. Likewise, magnetic recorders must have means for providing lateral stepping and means for providing vertical stepping where the recorder is adapted to process magnetic records in the shape of cards as opposed to tapes.

The typewriting and magnetic recording portions of editing typewriters of the prior art have typically been housed in two, structurally independent but electronically coupled units. With such arrangement each unit has had to have its own drive means for record stepping plus means to synchronize the stepping action of each unit in master-slave fashion. This requirement has necessitated the transduction of typewriter carriage and magnetic head motion, has created a sacrifice in overall machine compactness, and has added generally to machine complexity and cost.

In U.S. Pat. Application Ser. No. 137,165 filed Apr. 26, 1971, which application is assigned to the same assignee as the instant application, an editing typewriter is disclosed wherein the magnetic head is mechanically linked to the typewriter carriage. Lateral stepping of the carriage causes, in "pantographic-like" reaction ("pantographic" defining linearly corresponding motion, as used herein), the magnetic head to be laterally stepped over an adjacently supported magnetic record. This mechanical coupling eliminates the need for electronically synchronizing the two stepping operations, for transducing the carriage or magnetic head, simplified the drive mechanisms, and reduces the overall space requirements of the machine.

For all the many advantages offered by the just-described editing typewriter there nevertheless remains a problem associated with the editing operation. The magnetic recorder here employs a read and write type magnetic head wherein a single magnetic gap is used for both reproducing and recording, which is to say reading and writing, respectively. When a character is typed by extraneous order a magnetic record of the typed character is recorded as the carriage steps laterally to the left and the magnetic head steps likewise relative to the magnetic record medium. However, for a previously entered magnetic character to be read the read and write magnetic head must first be stepped over the magnetic character before the character may be recognized for typing. To prevent printed copy from being typed one character space to the right the read and write magnetic head must be indexed one character space to the right in shifting from record to reproduce modes of operation. Otherwise, in entering a correction on the magnetic record the typewriter printing station would have to be located one space to the right instead of directly over the character to be edited. This, of course, is confusing to the operator.

In addition to the need for indexing to facilitate magnetic reading the dimensions of the magnetic gap used therefor should be smaller than that used for recording to allow registration of the reproducing head with recorded information without reduction of playback signals from vertical misalignment or reproduction of fringe recordings from previous use of the magnetic record. Where a fixed, unitary read and write magnetic head is employed that is, of course, not possible.

Accordingly, it is a general object of the present invention to provide an improved editing typewriter.

More specifically, it is an object of the present invention to provide an editing typewriter of the type wherein either the typewriter platen or printing type is "pantographically" (i.e., linearly corresponding motion) linked to either the magnetic head or the magnetic record support, which typewriter does not have to be indexed in shifting from record to reproduce modes of operation, or vice versa, or in performing editing operations.

Another object of the present invention is to provide an editing typewriter of the just mentioned type wherein the magnetic gap used in reproducing is smaller than the magnetic gap used in recording.

SUMMARY OF THE INVENTION

Briefly described, the present invention is an editing typewriter comprising typewriter elements consisting of a platen and printing type spaced from the platen. Means are provided for stepping one of the typewriter elements with respect to the other of the typewriter elements to effect character spacing within a line of type. Magnetic recorder support elements are also provided consisting of a magnetic record support and a magnetic head support mounted adjacent the magnetic record support for relative movement in a predetermined direction with respect to the magnetic record support. A magnetic recording head is mounted to the magnetic head support. A magnetic reproducing head is also mounted to the magnetic head support spaced from the magnetic recording head in the aforementioned predetermined direction. Structural means pantographically link one of the typewriter elements with one of the magnetic recorder support elements whereby the magnetic recording head and the magnetic reproducing head may be stepped in the predetermined direction with respect to the magnetic record support for magnetically recording and reproducing a line of magnetically encoded information on a magnetic record supported on the magnetic record support when one of the typewriter elements is stepped with respect to the other of the typewriter elements.

DESCRIPTION OF THE PREFERRED EMBODIMENT

Figure 1:
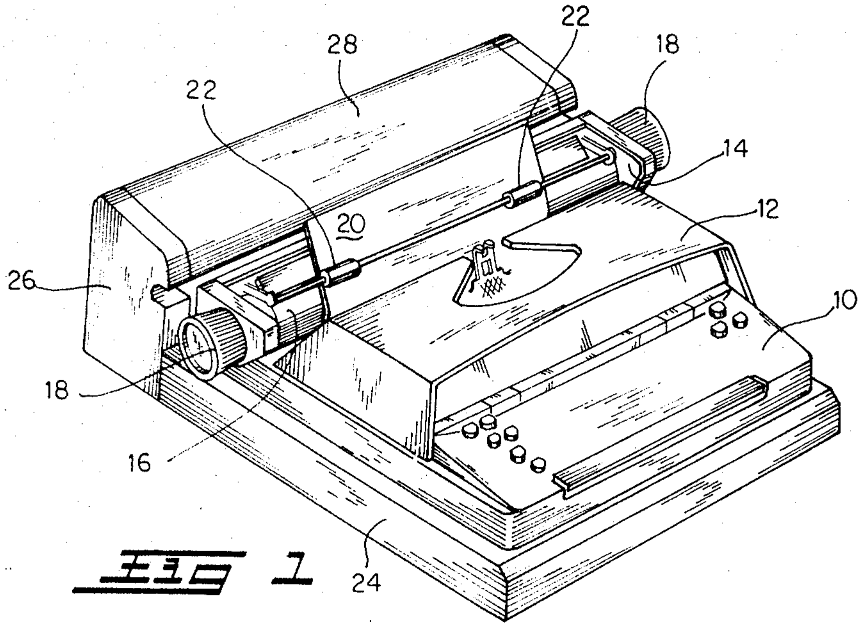
FIG. 1 is a perspective view of an editing typewriter incorporating principles of the present invention.
Figure 1A:
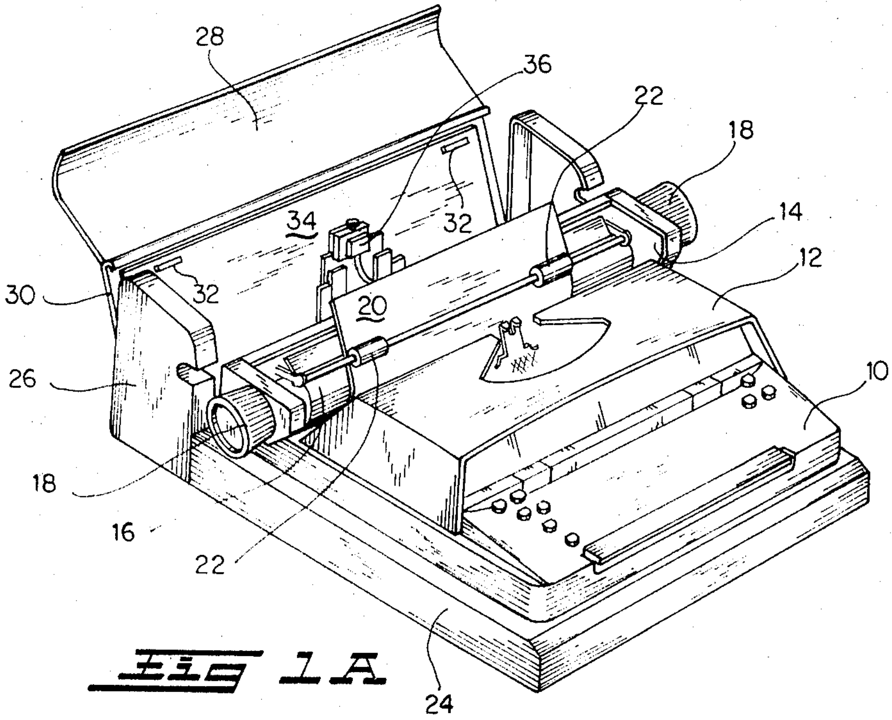
FIG. 1A is a perspective view of the editing typewriter shown in FIG. 1 with the magnetic recorder housing disposed in an open position.

Referring now in more detail to the drawing there is shown in FIG. 1 an editing typewriter incorporating principles of the present invention and comprising a keyboard 10, printing type cover 12, a carriage 14, a platen 16, a pair of platen knobs 18, and a printable record sheet 20 held to platen 16 by two bail rollers 22. To the rear of typewriter frame 24 is secured a magnetic recorder housing 26. As may be seen more clearly by reference to FIG. 1A the recorder housing has a top cover 28 rotatably mounted to card support backing plate 30 which in turn is rotatably mounted to the bottom member of the recorder housing. In this open position two card-alignment tabs 32 are shown mounted to backing plate 30. A magnetic card 34 is held in alignment on the card support backing plate by card indexing holes through which tabs 32 fit. A composite magnetic head 36 is also revealed in the open position of the recorder housing shown in FIG. 1A which composite head may be moved laterally while closely adjacent to magnetic card 34 when backing plate 30 is disposed in its closed position as shown in FIG. 1.

Figure 2:
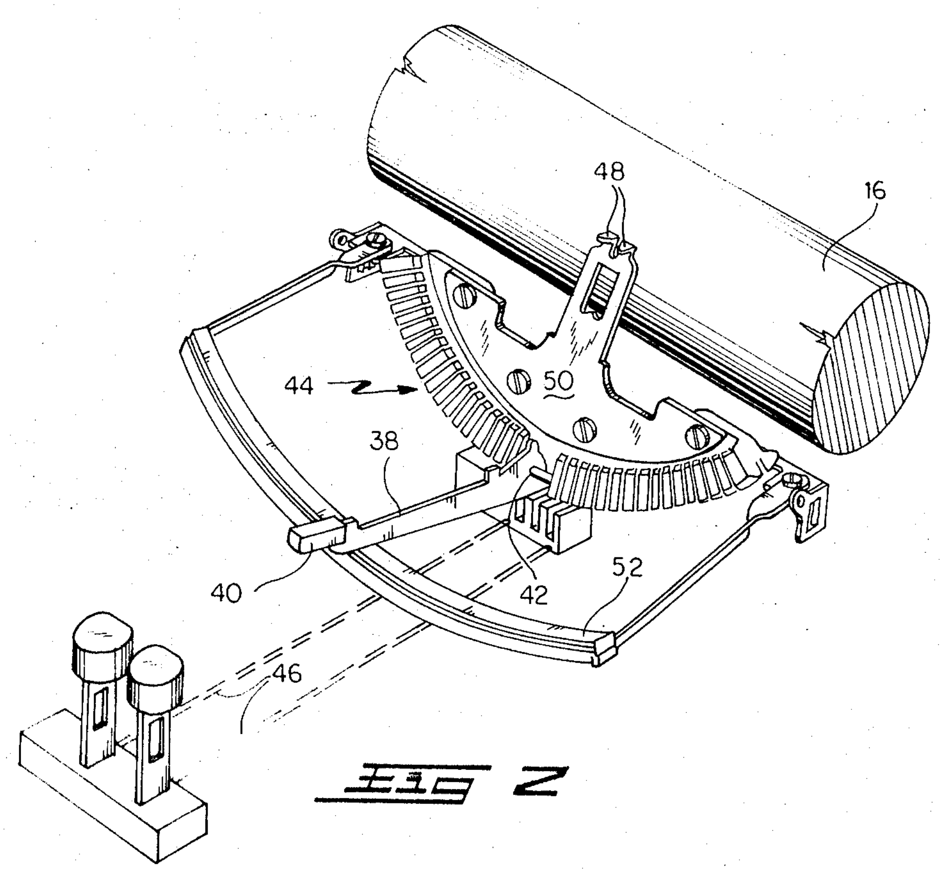
FIG. 2 is a perspective view of printing type elements of the editing typewriter shown in FIG. 1 with means shown schematically for actuating same.

In FIG. 2 is shown an example of means for engaging printing type housed under type cover 12 with platen 16. It should, of course, be understood that the particular means here illustrated represent but one of many which have been widely known in typewriter art for many years. In addition, it should be appreciated that non-impact printing means such as heating font may be substituted for the impact printing type specifically shown here and that the phrase "printing type" is intended to include such herein.

Here, one of a set of printing typebars 38 is shown having a type head 40 with character font mounted on one end thereof. The typebars are rotatably mounted to the typebar fulcrum wire 42 which in turn traverses typebar segmented frame 44. Each typebar is electromechanically linked by well-known transduction means to a key in keyboard 10 as schematically represented by lines 46. Upon depression of a key in keyboard 10 a typebar so coupled thereto is caused to rotate on typebar fulcrum wire 42 in bellcrank fashion causing type head 40 secured to the end thereof to rotate clockwise. As the type head approaches platen 16 it passes between guide lips 48 of typeguide anvil assembly 50 and enters a printing station where it will strike platen 16 or a printable record sheet located thereon. Upon striking platen 16 the typebar rebounds and rotates counterclockwise about fulcrum wire 42 to its stayed position resting against cushion 52.

Figure 3:
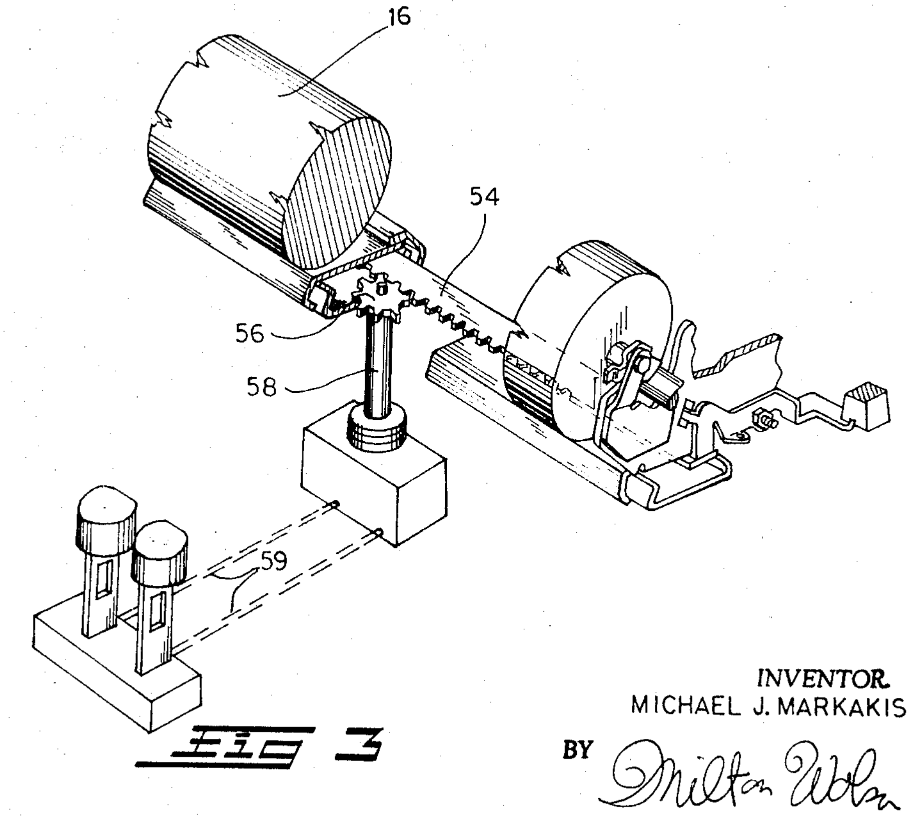
FIG. 3 is a perspective view of a portion of the typewriter platen shown in FIG. 1 together with means for stepping it laterally with respect to the printing station.

In FIG. 3 means are illustrated for stepping carriage 14 and platen 16 attached thereto past the aforementioned printing station. Such means include an escapement rack 54 mounted to the bottom of carriage 14 and pinion 56 rotatably mounted in engagement therewith. Pinion 56 is end mounted on shaft 58 which in turn is electromechanically coupled to the keys of keyboard 10 by well-known transduction means as schematically illustrated by lines 59. Upon actuation of a key, pinion 56 will be caused to rotate, stepping escapement rack 54 a predetermined linear distance together with carriage 14 and platen 16 secured thereto. Upon carriage return, pinion 56 is either temporarily disengaged or caused to rotate freely by suitable clutch means. A more detailed explanation of such a stepping mechanism may be had by reference to U.S. Pat. No. 2,896,767.

Figure 4:
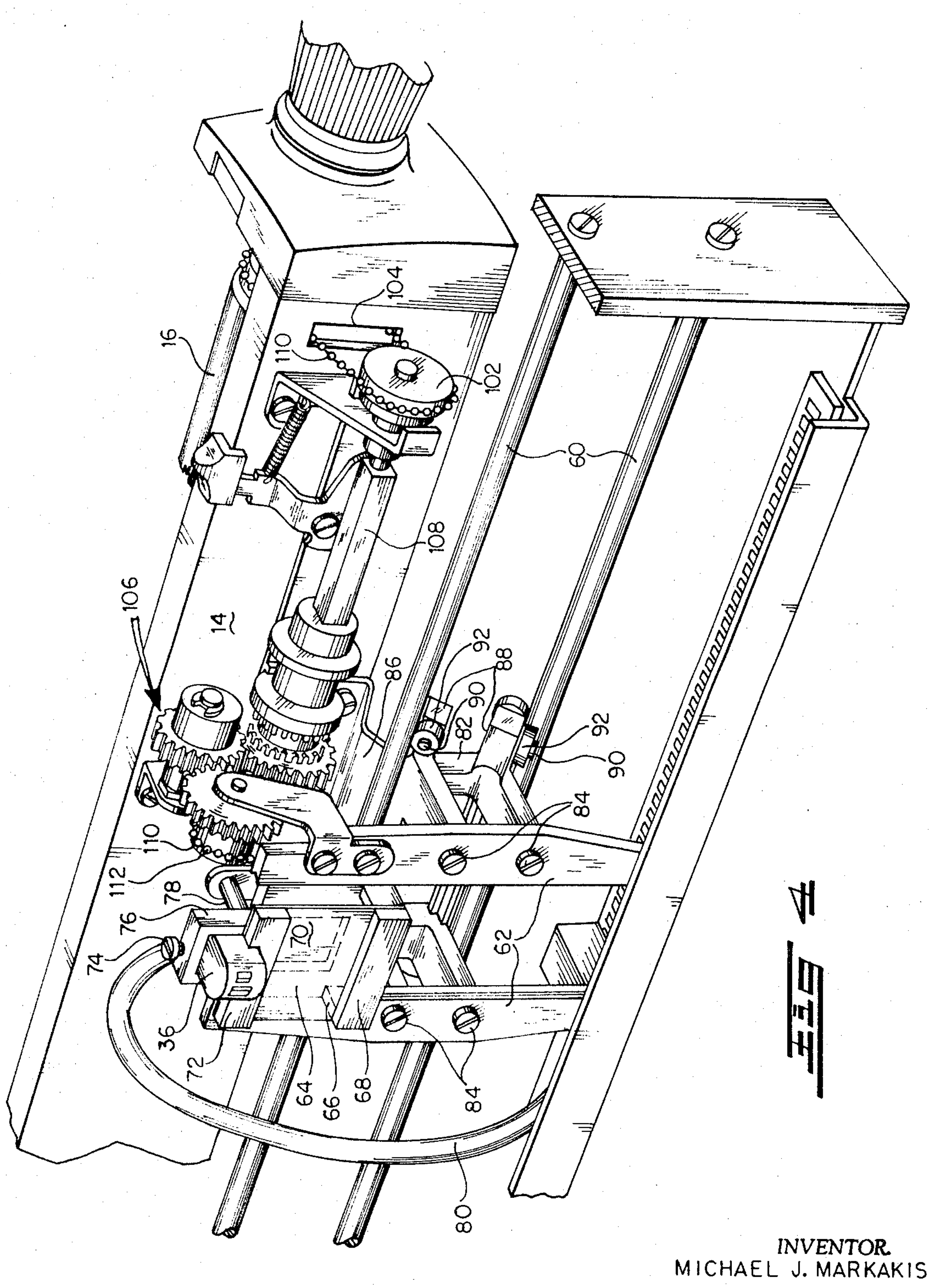
FIG. 4 is a perspective view of elements of the magnetic recorder portion of the editing typewriter shown in FIG. 1.
Figure 5:
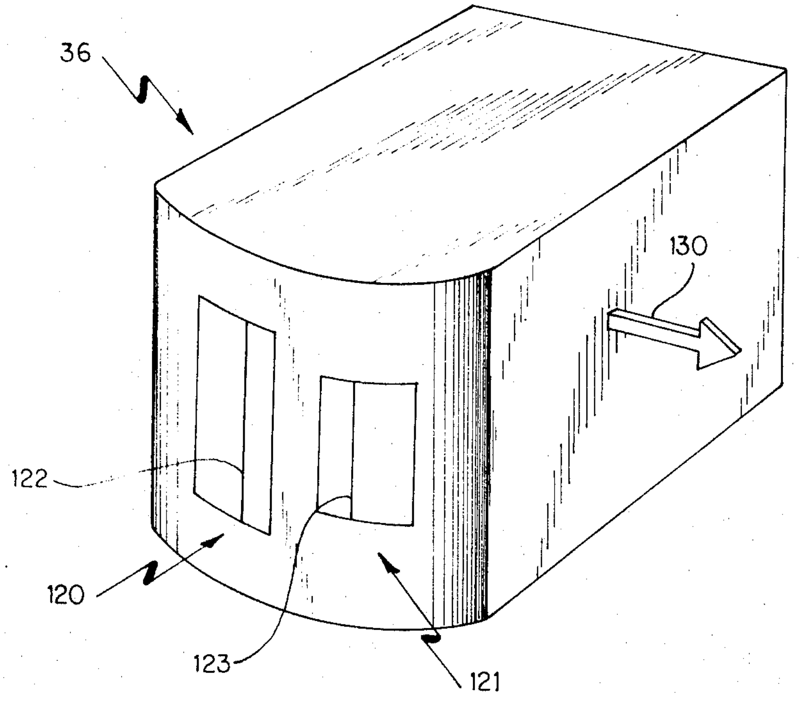
FIG. 5 is a perspective view of the magnetic head component of the magnetic recorder portion of the editing typewriter shown in FIG. 4.

In FIG. 4 the magnetic recorder is shown to comprise two vertically-spaced cylindrical guide rails 60 rigidly mounted to the sides of recorder housing 26 upon which the magnetic head assembly is guided during lateral, generally horizontal, stepping action. The magnetic head assembly includes two spaced vertical guide plates 62, the opposing edges of which have V-shaped indentures into which slidably fits a U-shaped backing member 64. Both the two vertical guide plates and backing member are preferably made of aluminum with the backing member being anodized. To the bottom of backing member 64 are attached two support blocks 66 and 68 between which is sandwiched the lower end of a planar, cantilevered spring 70. The top of spring 70, which is biased slightly away from tyepwriter carriage 14, is secured to bar 72 having a U-shaped indenture into which snugly fits rectilinear composite magnetic head 36. The composite magnetic head is held tightly in place by screw 74 which is journalled through inverted U-shaped bracket 76 which bracket is in turn rigidly fastened to bar 72 with spring 70 sandwiched therebetween. A guide rod 78 projects from bar 72 through a hole (not visible in FIG. 4) in guide bracket 76. The bottom of guide bracket 76 is secured to the lower portion of backing member 64. One end of flexible cable 80 is secured to guide bracket 76 from which end extend electrical conductors which are coupled to the terminals (not shown) of composite magnetic head 36. Conductors from the other end of cable 80 are connected (not shown in FIG. 4) to a write driver and pre-amplifier as schematically illustrated in FIG. 5.

Each of the two vertical guide plates 62 is rigidly secured to two feet of magnetic head transport frame 82 by screws 84. Frame 82 is in turn secured to typewriter carriage 14 by mounting bracket 86. From each of four horizontal projections 88 of frame 82 extend a set of axles 90 having roller bearings 92 rotatably mounted thereon. Each set consists of two axles oriented orthogonally to one another. Each of the eight rollers rotatably mounted on the four sets of axles contact a guide rail 60. With the magnetic head assembly so secured to carriage 14 in contact with guide rails 60 lateral movement of the typewriter carriage and platen causes lateral movement of magnetic head 36 "pantographically" (i.e., linearly corresponding motion) on a one to one lateral, linear displacement ratio over the surface of card support backing plate 30 and magnetic card 34 positioned thereon. Through the composite magnetic head is "pantographically" linked to the typewriter carriage in FIG. 4 it should be appreciated that alternatively the magnetic head could be so linked to the typewriter platen or that the platen or carriage could be so linked to the card support backing plate. With such alternative coupling configurations the composite magnetic head would still move laterally with respect to the card support backing plate when relative movement occurs between the typewriter carriage and platen.

Vertical movement of composite magnetic head 36 is effected by rotation of platen 16 through a transmission drive comprising a drive chain 100 which rotatably couples drive pulley 102 with platen 16 through slot 104 in carriage 14. Drive pulley 102 is linked to gear train 106 by means of square drive shaft 108. To the last gear in gear train 106 is secured pulley 110 which rotatably engages drive chain 112. Drive chain 112 is in turn fastened to U-shaped backing member 64 to which magnetic head 36 is held. A detent mechanism, not shown, is mounted to one of the vertical guide plates 62 and engages one of the gears in gear train 106.

The mechanical, "panographic" linking of one of the typewriter elements with one of the magnetic recorder elements eliminates the need for independent magnetic recorder drive means. This is so because relative lateral motion between the typewriter platen and printing type in effecting individual character spacing in one line of print is directly transmitted to the recorder elements. Thus, in the embodiment shown in FIGS. 1–5, lateral movement of the typewriter carriage and platen assembly relative to the typebars in and of itself causes the composite magnetic head to be laterally stepped over the magnetic record support of a magnetic record supported thereon. Not only is the composite magnetic head thereby positioned over the magnetic card, but the motion required for magnetic recording itself is provided.

Figure 6:
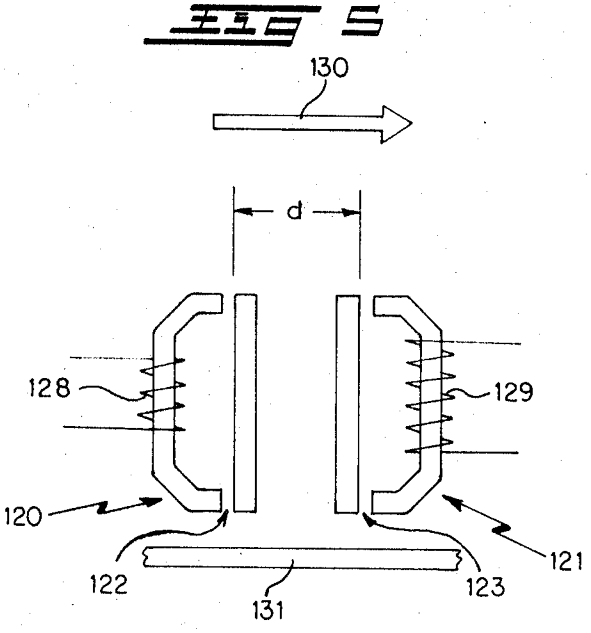
FIG. 6 is a plan view of operative components of the magnetic head shown in FIG. 5. For clarity the various components are shown greatly out of scale.

In FIGS. 5 and 6 composite magnetic head 36 is seen to comprise record head 120 and reproduce head 121 having magnetic gaps 122 and 123, respectively. The length of magnetic gap 123 is preferably smaller than that of magnetic gap 122. In one preferred embodiment, for example, the length of magnetic gap 122 is 0.3 mils while that of gap 123 is 0.1 mils. The two gaps are spaced apart a distance *d* as measured in the direction of arrow 130 which arrow indicates the direction magnetic head 36 moves relative to magnetic record 131. Distance *d* is preferably that between adjacent magnetic character spaces in a single recorded line of characters. Typically such distance is 100 mils. If desired however distance *d* could be that between two magnetic character spaces to anticipate case shifts. Such would, of course, require character by character storage of information accomplishable by suitable buffer means.

Coil 128 is schematically shown wound about a portion of the magnetic core of record head 120. Coil 129 is likewise shown wound about a portion of the magnetic core of reproduce head 121. Coil 129 preferably comprises more turns than coil 128 for effective reproduction. Each coil is electrically coupled to the terminals of composite magnetic head 36 and hence to flexible cable 80.

Figure 7:
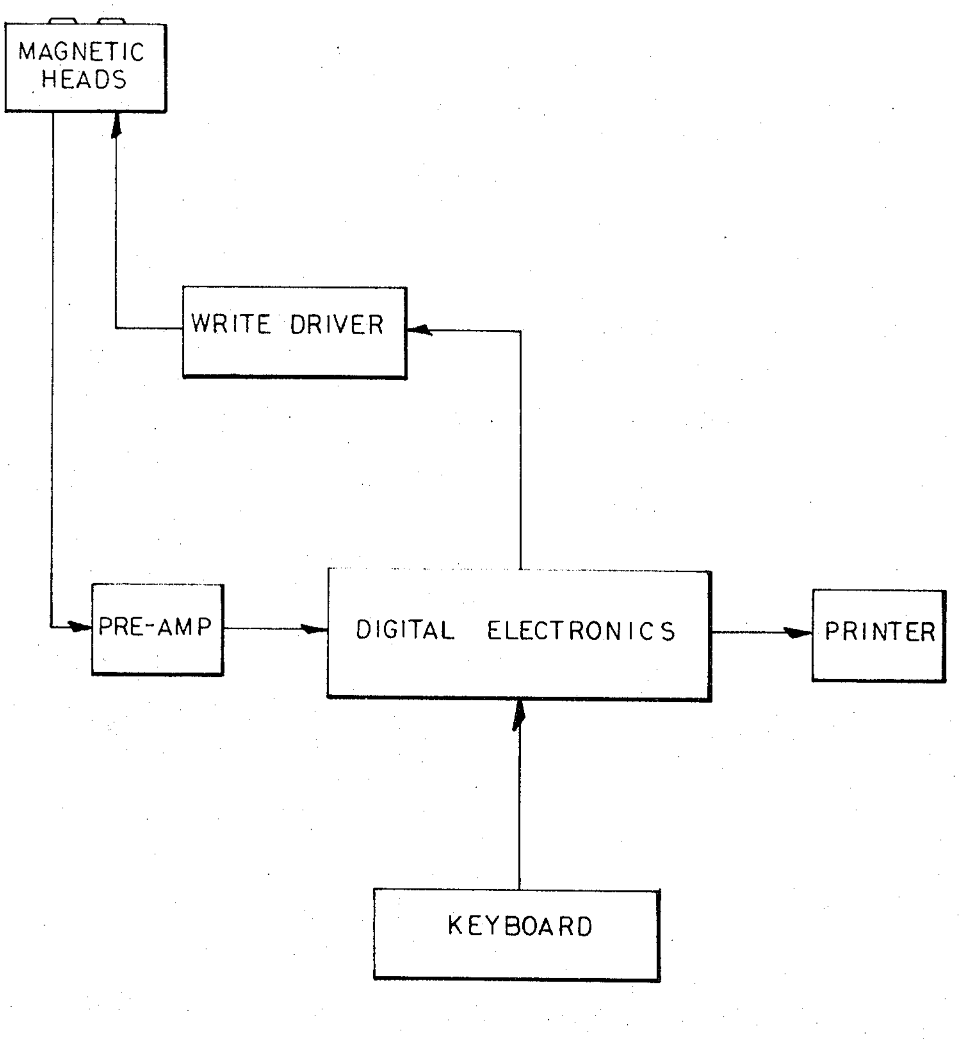
FIG. 7 is a block diagram of principal, functional components of the editing typewriter shown in FIG. 1.

As shown in FIG. 7 input signals from the typewriter keyboard, or from a remote source extraneous to the machine, may be fed to the digital electronics wherein they are encoded as parallel signals. One of these encoded signal outputs is fed to the write driver for recording serial data bits by means or record head 120 on magnetic record 131 positioned adjacent thereto. The other parallel signal may be decoded by a suitable decoding matrix and fed to actuating solenoids in the typewriter printer. For typing out previously recorded information from the recorder reproduce head 121 transduces magnetically recorded signals and feeds them as electric signals to the digital electronics. By these well-known means one may simultaneously make printed and magnetic records of the keyboard input, may edit such records by re-entering correcting keyboard signals, and may also make printed records from magnetic records without input signals from the keyboard. All this may be accomplished with the "pantographic" linkage of the typewriter and magnetic recorder components and yet without need for sensors and implementing indexing mechanisms to register inputs and outputs during machine operations.

It should be understood that the just-described embodiment is merely illustrative of principles of the invention. Many modifications may, of course, be made thereto without departure from the spirit and scope of the invention as set forth in the following claims.

I claim:

1. An editing typewriter comprising:

typewriter elements consisting of a platen supporting successive ones of aligned print record members and printing type spaced from said platen;

means actuatable for selectively operating said printing type to produce a line of type on a said print record member including means for stepping one of said typewriter elements with respect to the other of said typewriter elements to effect character spacing within said line of type;

magnetic recorder support elements consisting of a magnetic record support and a magnetic head support positioned adjacent one another and mounted for relative movement in a predetermined direction;

a magnetic record distinct from said print record member and supported on said magnetic record support;

a recording head mounted to said magnetic head support;

a reproducing head mounted to said magnetic head support and displaced from said recording head in said predetermined direction by an integral number of spaces in terms of said character spacing;

structural means linking said steppable one of said typewriter elements with one of said magnetic recorder support elements to thereby step said magnetic recording head in said predetermined direction relative to said magnetic record support for recording a line of information on said magnetic record in response to actuation of said printing type operating means to produce an original line of type;

means for operating the editing typewriter in a reproducing mode wherein said information in said magnetic record is scanned by said reproducing head at least one character space in advance of actuation of each selected printing type; and means responsive to said scanning for operating said actuatable means, whereby said original line of type is identically and alignedly reproduced on a successive one of said print record members, as said reproducing head is stepped over said magnetic record in response to operation of said printing type.

2. An editing typewriter in accordance with claim 1 wherein said magnetic reproducing head is displaced from said magnetic recording head one character space in said predetermined direction.

3. An editing typewriter in accordance with claim 1 wherein said magnetic reproducing head comprises a first magnetic core defining a first magnetic gap, said magnetic recording head comprises a second magnetic core defining a second magnetic gap, and wherein said first magnetic gap is smaller than said second magnetic gap.

4. An editing typewriter in accordance with claim 1 wherein said magnetic reproducing head comprises a first magnetic core having a first electrically conductive coil wound thereabout, said magnetic recording head comprises a second magnetic core having a second electrically conductive coil wound thereabout, and wherein said first electrically conductive coil has more turns than said second electrically conductive coil.

5. An editing typewriter in accordance with claim 1 wherein said platen is pantographically linked to said magnetic head support.

6. An editing typewriter in accordance with claim 1 comprising means for stepping said magnetic head support with respect to said magnetic record support in a direction substantially orthongonal to said predetermined direction to effect magnetic character line spacing.

7. An editing typewriter in accordance with claim 6 wherein said means for stepping said magnetic head support with respect to said magnetic record support in a direction substantially orthogonal to said predetermined direction are mechanically linked to said platen.

* * * * *